US008955338B2

(12) United States Patent
Jung et al.

(10) Patent No.: US 8,955,338 B2
(45) Date of Patent: Feb. 17, 2015

(54) LIQUID TANK WITH COMBINED LIQUID FILLING AND LIQUID EXTRACTION CONDUIT

(75) Inventors: Marcus Jung, Alsbach (DE); Rainer Immel, Dexheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 1771 days.

(21) Appl. No.: 11/612,096

(22) Filed: Dec. 18, 2006

(65) Prior Publication Data

US 2008/0141684 A1 Jun. 19, 2008

(51) Int. Cl.
*F17C 7/02* (2006.01)
*F17C 3/00* (2006.01)
*F17C 6/00* (2006.01)
*F17C 9/00* (2006.01)

(52) U.S. Cl.
CPC ... *F17C 3/00* (2013.01); *F17C 6/00* (2013.01); *F17C 9/00* (2013.01); *F17C 2203/03* (2013.01); *F17C 2203/0391* (2013.01); *F17C 2203/0629* (2013.01); *F17C 2205/0335* (2013.01); *F17C 2205/0352* (2013.01); *F17C 2205/0355* (2013.01); *F17C 2205/0367* (2013.01); *F17C 2205/0391* (2013.01); *F17C 2209/221* (2013.01); *F17C 2221/011* (2013.01); *F17C 2221/012* (2013.01); *F17C 2221/014* (2013.01); *F17C 2221/017* (2013.01); *F17C 2223/0161* (2013.01); *F17C 2223/033* (2013.01); *F17C 2223/043* (2013.01); *F17C 2223/047* (2013.01); *F17C 2225/0123* (2013.01); *F17C 2225/0161* (2013.01); *F17C 2225/033* (2013.01); *F17C 2225/043* (2013.01); *F17C 2225/045* (2013.01); *F17C 2225/047* (2013.01); *F17C 2260/012* (2013.01); *F17C 2260/013* (2013.01); *F17C 2270/0168* (2013.01); *F17C 2270/0184* (2013.01); *Y02E 60/321* (2013.01)
USPC ............ 62/50.1; 62/48.1; 62/50.7; 220/560.1; 220/560.12

(58) Field of Classification Search
USPC .......... 62/48.1, 50.1, 50.7; 220/560.1, 560.12
See application file for complete search history.

(56) References Cited

U.S. PATENT DOCUMENTS

| 3,364,688 | A | * | 1/1968 | Matlow et al. | 62/45.1 |
| 3,433,384 | A | * | 3/1969 | Caruthers, Jr. et al. | 220/560.1 |
| 5,561,983 | A | * | 10/1996 | Remes et al. | 62/48.1 |
| 6,634,519 | B2 | * | 10/2003 | Pelloux-Gervais et al. | 220/560.1 |
| 7,073,339 | B2 | * | 7/2006 | Hall et al. | 62/48.1 |

* cited by examiner

*Primary Examiner* — Frantz Jules
*Assistant Examiner* — Azim Abdur Rahim
(74) *Attorney, Agent, or Firm* — Fraser Clemens Martin & Miller LLC; James D. Miller

(57) ABSTRACT

A cryogenic fluid storage tank having a first conduit adapted for filling and extracting a cryogenic liquid from the tank and a second conduit adapted for filling and extracting a gas from the tank is disclosed, wherein heat originating from inlet and outlet conduits transferred to the tank is minimized.

12 Claims, 1 Drawing Sheet

LIQUID TANK WITH COMBINED LIQUID FILLING AND LIQUID EXTRACTION CONDUIT

FIELD OF THE INVENTION

The invention relates generally to a cryogenic storage tank, and more particularly, to an improved cryogenic storage tank with a minimized heat transfer to the cryogenic fluid originating from inlet and outlet conduits.

BACKGROUND OF THE INVENTION

Electric vehicles and internal combustion engine powered vehicles may be powered by a number of different fuels. Internal combustion engine powered vehicles may be powered by various fuels including gasoline, diesel, ethanol, methane, or hydrogen, for example. Fuel cells have been proposed as a power source for electric vehicles, and other applications. In proton exchange membrane (PEM) type fuel cells, hydrogen is supplied to an anode of the fuel cell and oxygen is supplied as an oxidant to a cathode. A common technique for storing large quantities of hydrogen is to cool and compress hydrogen via liquefaction techniques, and to store the liquid phase hydrogen in a cryogenic storage tank. Hydrogen gas liquefies at −253° C. and can be stored at about 70 g/L in the liquid phase. The amount of energy required to compress hydrogen gas into a liquid is very high, and currently may use as much as 40% of the energy obtained from the hydrogen fuel. Thus, it is advantageous to keep the liquid phase hydrogen insulated to militate against liquid evaporation.

Any transfer of heat to the innermost portion of the cryogenic storage tank affects the natural evaporation rate of the cryogenic vessel. The more heat that is transferred, the faster the rate of boil-off of the liquid hydrogen, or the higher the natural evaporation rate. In order to maintain the hydrogen in a liquid state, heat transfer from the ambient environment to the cryogenic liquid must be kept to a minimum. Cryogenic storage tanks generally consist of an inner storage vessel encapsulated with an outer vessel or shell. The space between the inner vessel and the outer vessel is commonly well insulated and under a vacuum. The interior of the tank, however, must include fluid communication, typically in the form of inlet and outlet conduits, for the filling and extraction of liquid and gaseous hydrogen.

A typical storage tank includes a liquid inlet conduit, a liquid outlet conduit, and a gas conduit adapted to be both an inlet and outlet. The three conduits typically penetrate a sidewall of the storage tank through three separate apertures, or together in a common vacuum tube penetrating the sidewall. At least a portion of each conduit is exposed to the ambient environment. The conduits bridge any insulation that is present between the inner and outer vessel and allow heat from the ambient environment to transfer into the inner vessel. Accordingly, there is a need for an improved cryogenic liquid storage tank, and particularly, one that minimizes heat transfer originating from the inlet and outlet conduit.

It would be desirable to develop a cryogenic storage tank with a minimized heat transfer originating from inlet and outlet conduits.

SUMMARY OF THE INVENTION

Concordant and congruous with the present invention, a cryogenic storage tank with a minimized heat transfer originating from inlet and outlet conduits, has surprisingly been discovered.

In one embodiment, the cryogenic fluid storage tank comprises a tank adapted to store a cryogenic fluid; a first conduit penetrating said tank and having an outlet and an inlet disposed within said tank, said first conduit adapted to supply a cryogenic liquid to said tank through the outlet and extract the cryogenic liquid from said tank through the inlet; and a second conduit penetrating said tank and disposed within said tank adapted to selectively supply a gas to said tank and extract the gas from said tank.

In another embodiment, the cryogenic fluid storage tank comprises a tank adapted to store a cryogenic fluid; a first conduit penetrating said tank and having an outlet and an inlet disposed within said tank, said first conduit adapted to supply a cryogenic liquid to said tank through the outlet and extract the cryogenic liquid from said tank through the inlet, wherein the outlet is disposed substantially in a gaseous phase of said tank reservoir and the inlet is disposed substantially in a liquid phase of said tank reservoir; and a second conduit penetrating said tank and disposed within said tank adapted to selectively supply a gas to said tank and extract the gas from said tank, wherein the first aperture of said second conduit is disposed substantially in a gaseous phase of said tank reservoir.

In another embodiment, the cryogenic fluid storage tank comprises a tank adapted to store a cryogenic fluid; a first conduit penetrating said tank and having an outlet and an inlet disposed within said tank, said first conduit adapted to supply a cryogenic liquid to said tank through the outlet and extract the cryogenic liquid from said tank through the inlet, wherein the outlet is disposed substantially in a gaseous phase of said tank reservoir and the inlet is disposed substantially in a liquid phase of said tank reservoir; and a second conduit penetrating said tank and disposed within said tank adapted to selectively supply a gas to said tank and extract the gas from said tank, wherein the first aperture of said second conduit is disposed substantially in a gaseous phase of said tank reservoir; and a vacuum tube penetrating a sidewall of said tank, wherein a portion of said first conduit and a portion of said second conduit are disposed in the vacuum tube.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
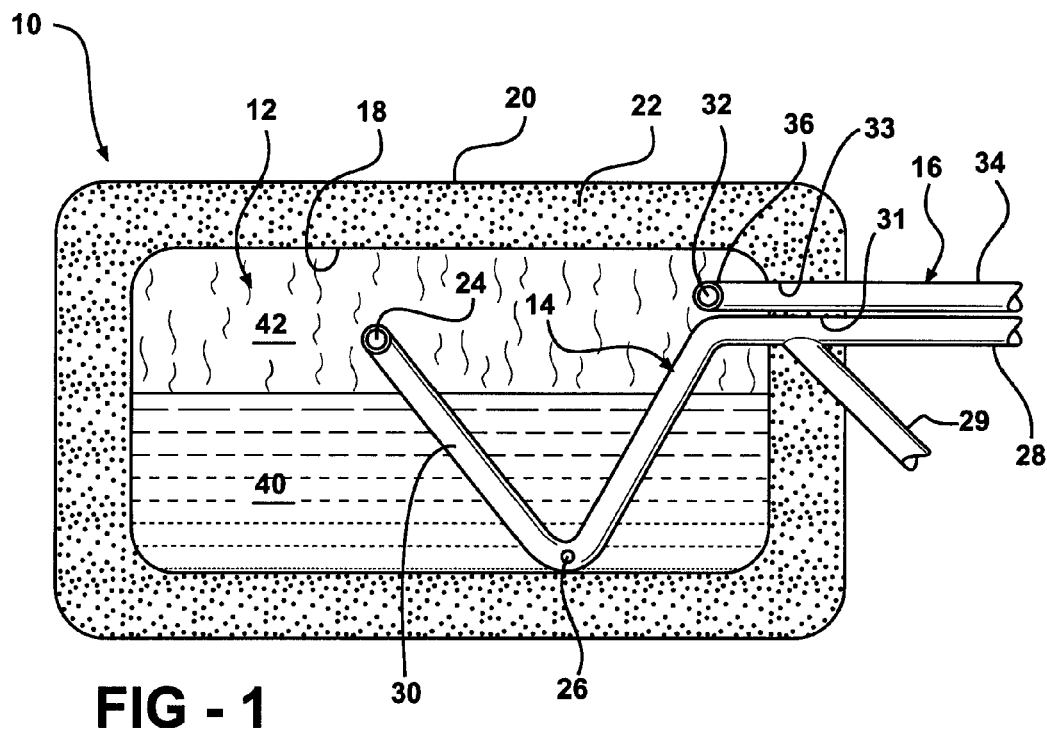
FIG. 1 is a schematic sectional view of a cryogenic storage tank according to an embodiment of the invention.

FIG. 1 shows a storage tank 10 according to an embodiment of the invention. The storage tank 10 includes a reservoir 12, a first conduit 14, and a second conduit 16. An inner vessel 18 forms the reservoir 12. The inner vessel 18 is disposed in an outer vessel 20 forming an interstitial space therebetween. The space between the inner vessel 18 and the outer vessel 20 is filled with a multi-layered thermal vacuum insulation 22. It is understood that the space between the inner vessel 18 and outer vessel 20 may be filled with any insulation, as desired, or the space can remain empty.

In the embodiment shown, the first conduit 14 includes a first portion 28, a second portion 30, and an extraction conduit 29. The first conduit 14 extends through a first penetration of the storage tank 10 to provide fluid communication between the reservoir 12 and a source of fluid (not shown). It is understood that the first conduit 14 may also be in fluid communication with another storage tank (not shown), a fuel cell stack (not shown), or an internal combustion engine (not shown), as desired. The first penetration 31 is formed by a series of apertures in the outer vessel 20, insulation 22, and inner vessel 18 that provide a channel adapted to receive a portion of the first conduit 14. The first portion 28 includes an inlet (not shown) formed at a distal end thereof in communication with the source of fluid. The second portion 30 is substantially v-shaped and includes an outlet 24 formed at a distal end thereof and an inlet 26 formed intermediate the outlet 24 and the first penetration. In the embodiment shown, the inlet 26 has a diameter less than a diameter of the outlet 24. It is understood that the dimensions of the diameters may be equal or the diameter of the outlet 24 may be less than the diameter of the inlet 26, as desired. It is further understood that the outlet 24 and inlet 26 may also be adapted to be both an inlet and an outlet, as desired. The outlet 24 is disposed substantially near a top of the storage tank 10, above a cryogenic liquid 40 and in a gas 42. The inlet 26 is disposed substantially near a bottom of the storage tank 10, in the cryogenic liquid 40. It is understood that the first conduit 14 may have any shape with the outlet 24 in the gas 42 and above the cryogenic liquid 40 and the inlet 26 in the cryogenic liquid 40, such as a substantial u-shape, or substantial semi-circular shape, as desired. As shown, the extraction conduit 29 penetrates the insulation 22 and outer vessel 20 and is in fluid communication with the source of fluid. It is understood that the extraction conduit 29 may be disposed anywhere on the first conduit 14, as desired. It is also understood that the cryogenic liquid 40 and gas 42 may be any fluid such as hydrogen, oxygen, nitrogen, and helium, for example, as desired.

The second conduit 16 includes a first portion 34 and a second portion 36. The second conduit 16 extends through a second penetration 33 of the storage tank 10 to provide fluid communication between the reservoir 12 and the source of fluid. The second penetration 33 is formed by a series of apertures in the outer vessel 20, insulation 22, and inner vessel 18 that provide a channel adapted to receive a portion of the second conduit 16. The first portion 34 includes an inlet (not shown) and an outlet (not shown), each formed at a distal end thereof. It is understood that the inlet of the first portion 34 may be in communication with the refueling source, another source of liquid, or a source of gas, as desired. It is understood that the outlet of the first portion 34 may be in communication with a fuel cell stack, an internal combustion engine, or a waste tank, as desired. The second portion 36 terminates at an aperture 32 adapted to be an inlet and outlet. The aperture 32 is disposed substantially near a top of the storage tank 10, above the cryogenic liquid 40 and in the gas 42. It is understood that the second portion may be curvilinear, helical, and otherwise shaped, as desired.

During a filling operation, the cryogenic liquid 40 is caused to flow through the first conduit 14 into the reservoir 12 of the storage tank 10. The cryogenic liquid flows through the outlet 24 and through the gas at the top of the storage tank 10 before flooding to the bottom of the storage tank 10. As the cryogenic liquid 40 passes through the gas 42 at the top of the storage tank 10, the gas 42 is cooled. Simultaneously, a portion of the cryogenic liquid may flow through the inlet 26 into the bottom of the reservoir 12. The rate of flow of the cryogenic liquid 40 through the inlet 26 is typically less than the rate of flow of the cryogenic liquid 40 through the outlet 24 due to the difference of the inlet 26 and outlet 24 diameter sizes. It is understood that the inlet 26 may have a seal, a gasket, a valve, or other means of regulating flow so that during a filling operation flow through the inlet 26 is militated against. Simultaneously with the cryogenic liquid 40 filling, the gas 42 may be extracted from the storage tank 10 through the second conduit 16 to relieve the pressure in the reservoir 12 and to facilitate a filling of the storage tank 10 with the cryogenic liquid 40.

During an extraction operation, the cryogenic liquid 40 is caused to flow through the inlet 26 of the first conduit 14, through the extraction conduit 29, and out of the storage tank 10. Before liquid extraction may occur the cryogenic liquid 40 must first flow through the inlet 26 to flood the first conduit 14. Typically, the level of the liquid 40 in the first conduit 14 will be equal to the level of the liquid 40 in the reservoir 12. Simultaneously, if desired, the gas 42 may be caused to flow through the aperture 32 of the second conduit 16 and into the storage tank 10 or the gas 42 may be caused to flow through the aperture 32 out of the storage tank 10, as desired. The difference in size of the diameters of the inlet 26 and outlet 24 facilitates regulation of the flow through the inlet 26 according to a desired extraction rate.

Use of the first conduit 14 and the second conduit 16 to perform all liquid and gas filling and extraction operations minimizes the overall number of conduits in the storage tank 10. By minimizing the number of conduits, the number of penetrations in the storage tank 10 into the reservoir 12 is minimized. Furthermore, the number of welds between the conduits 14, 16 and the storage tank 10 is also minimized which minimizes potential stress failures. Heat entry into the storage tank 10 and boil-off of the cryogenic liquid 40 is also minimized. Furthermore, by minimizing the number of conduits, the material costs, production costs, weight, and maintenance of the storage tank 10 is minimized.

Figure 2:
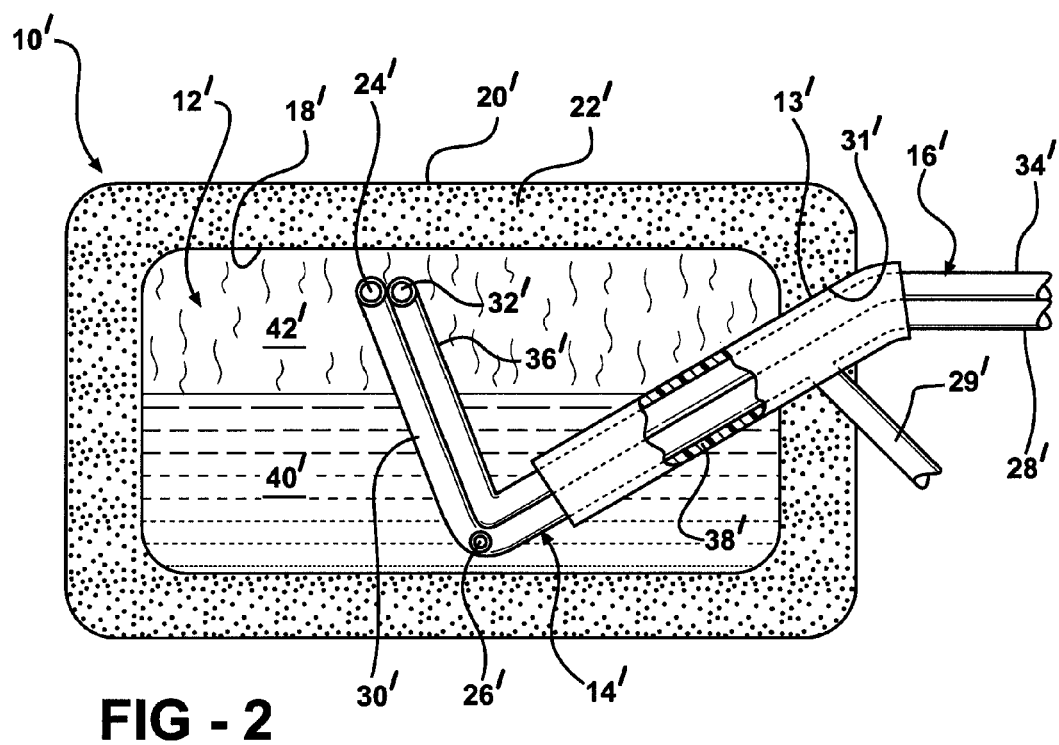
FIG. 2 is a schematic sectional view of a cryogenic storage tank according to another embodiment of the invention.

FIG. 2 shows a storage tank 10' according to another embodiment of the invention. The storage tank 10' includes a reservoir 12', a vacuum tube 13', a first conduit 14', and a second conduit 16'. The reservoir 12' is formed by an inner vessel 18'. The inner vessel 18' is disposed in an outer vessel 20' forming an interstitial space therebetween. The space between the inner vessel 18' and the outer vessel 20' is filled with a multi-layered thermal vacuum insulation 22'. It is understood that the space between the inner vessel 18' and outer vessel 20' may be filled with any insulation, as desired, or the space can remain empty.

The vacuum tube 13' is a conduit surrounding the first conduit 14' and the second conduit 16'. The vacuum tube 13' includes insulation 38' that surrounds the first conduit 14' and the second conduit 16'. It is understood that the vacuum tube 13' may be any conventional vacuum tube, as desired, and maybe be a double walled insulated vacuum tube, or may be filled with a multi-layered thermal vacuum insulation, as desired. The vacuum tube 13' is disposed through a first penetration 31' of the storage tank 10'. The first penetration 31' is formed by a series of apertures in the outer vessel 20', insulation 22', and inner vessel 18' that provide a channel adapted to receive a portion of the vacuum tube 13'. It is understood that the vacuum tube 13' may share a vacuum with the insulation 22', as desired.

In the embodiment shown, the first conduit 14' includes a first portion 28', a second portion 30', and an extraction conduit 29'. The first conduit 14' extends through the vacuum tube 13' to provide fluid communication between the reservoir 12' and a source of fluid (not shown). It is understood that the first conduit 14 may also be in fluid communication with another storage tank (not shown), a fuel cell stack (not shown), or an internal combustion engine (not shown), as desired. The first portion 28' includes an inlet (not shown) formed at a distal end thereof in communication with the source of fluid. The second portion 30' is substantially v-shaped and includes an outlet 24' formed at a distal end thereof and an inlet 26' formed intermediate the outlet 24' and the first feed-through. In the embodiment shown, the inlet 26' has a diameter less than a diameter of the outlet 24'. It is understood that the dimensions of the diameters may be equal or the diameter of the outlet 24' may be less than the diameter of the inlet 26', as desired. It is further understood that the outlet 24' and inlet 26' may also be adapted to be both an inlet and an outlet, as desired. The outlet 24' is disposed substantially near a top of the storage tank 10', above a cryogenic liquid 40' and in a gas 42'. The inlet 26' is disposed substantially near a bottom of the storage tank 10', in the cryogenic liquid 40'. It is understood that the first conduit 14' may have any shape with the outlet 24' in the gas 42' and above the cryogenic liquid 40' and the inlet 26' in the cryogenic liquid 40', such as a substantial u-shape, or substantial semi-circular shape, as desired. As shown, the extraction conduit 29' is disposed through the insulation 22' and outer vessel 20' and in fluid communication with the source of fluid. It is understood that the extraction conduit 29' may be disposed anywhere on the first conduit 14', as desired. It is also understood that the cryogenic liquid 40' and gas 42' may be any fluid such as hydrogen, oxygen, nitrogen, and helium, for example, as desired.

The second conduit 16' includes a first portion 34' and a second portion 36'. The second conduit 16' is disposed through the vacuum tube 13' to provide fluid communication between the reservoir 12' and the source of fluid. The second conduit 16' is disposed through the vacuum tube 13' and adjacent the first conduit 14'. The first portion 34' is substantially linear and includes an inlet (not shown) and an outlet (not shown), each formed at a distal end thereof. It is understood that the inlet of the first portion 34' may be in communication with the refueling source, another source of liquid, or a source of gas, as desired. It is understood that the outlet of the first portion 34' may be in communication with a fuel cell stack, an internal combustion engine, or a waste tank, as desired. The second portion 36' is substantially v-shaped and includes an aperture 32' adapted to be an inlet and outlet. The aperture 32' is disposed substantially near a top of the storage tank 10', above the cryogenic liquid 40' and in the gas 42'. It is understood that the second portion 36' may have any shape such as a substantial u-shape or substantial semi-circular shape, as desired.

During a filling operation, the cryogenic liquid 40' is caused to flow through the first conduit 14' into the reservoir 12' of the storage tank 10'. The cryogenic liquid flows through the outlet 24' and through the gas at the top of the storage tank 10' before flooding to the bottom of the storage tank 10'. As the cryogenic liquid 40' passes through the gas 42' at the top of the storage tank 10', the gas 42' is cooled. Simultaneously, a portion of the cryogenic liquid may flow through the inlet 26' into the bottom of the reservoir 12'. The rate of flow of the cryogenic liquid 40' through the inlet 26' is typically less than the rate of flow of the cryogenic liquid 40' through the outlet 24' due to the difference of the outlet 24' and the inlet 26' diameter sizes. It is understood that the inlet 26' may have a seal, a gasket, a valve, or other means of regulating flow so that during a filling operation flow through the inlet 26' is militated against. Simultaneously with the cryogenic liquid 40' filling, the gas 42' may be extracted from the storage tank 10' through the second conduit 16' to relieve the pressure in the reservoir 12' and to facilitate a filling of the storage tank 10' with the cryogenic liquid 40'.

During an extraction operation, the cryogenic liquid 40' is caused to flow through the inlet 26' of the first conduit 14', through the extraction conduit 29', and out of the storage tank 10'. Before liquid extraction may occur the cryogenic liquid 40' must first flow through the inlet 26' to flood the first conduit 14'. Typically, the level of the liquid 40' in the first conduit 14' will be equal to the level of the liquid 40' in the reservoir 12'. Simultaneously, if desired, the gas 42' may be caused to flow through the aperture 32' of the second conduit 16' and into the storage tank 10' or the gas 42' may be caused to flow through the aperture 32' out of the storage tank 10', as desired. The difference in size of the diameters of the inlet 26' and the outlet 24' facilitates regulation of the flow through the inlet 26' according to a desired extraction rate.

Utilizing only the first conduit 14' and the second conduit 16' to perform all liquid and gas filling and extraction operations minimizes the overall number of conduits in the storage tank 10'. By minimizing the number of conduits, the number of penetrations disposed in the storage tank 10' into the reservoir 12' is reduced. Furthermore, the number of welds between the conduits 14', 16' and the storage tank 10' is also minimized which minimizes potential stress failures. Heat entry into the storage tank 10' and boil-off of the cryogenic liquid 40' is also minimized. Furthermore, by minimizing the number of conduits, the material costs, production costs, weight, and maintenance of the storage tank 10' is minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A cryogenic fluid storage tank comprising:
    a tank having a tank reservoir adapted to store a cryogenic fluid including a cryogenic liquid and a gas;
    a first conduit penetrating said tank and having an outlet and an inlet formed therein, the outlet and the inlet disposed within said tank, wherein said first conduit conveys the cryogenic liquid to the outlet from the inlet only through a single passageway formed in an interior of said first conduit; and
    a second conduit penetrating said tank and disposed within said tank adapted to selectively supply the gas to said tank and extract the gas from said tank,
    wherein the outlet of said first conduit is an open terminal end of the single passageway formed in the interior of said first conduit and the inlet is disposed between the open terminal end and a portion of said tank where the first conduit penetrates said tank, and wherein the outlet of said first conduit is disposed substantially in a gaseous phase of said tank reservoir and the inlet of said first conduit is disposed substantially in a liquid phase of said tank reservoir,
    wherein said first conduit has a substantial v-shape and the inlet is formed in the first conduit adjacent a nadir of the v-shape near a bottom of the tank reservoir.

2. The storage tank of claim 1, further comprising a vacuum tube penetrating a sidewall of said tank, wherein a portion of said first conduit and a portion of said second conduit are disposed in said vacuum tube.

3. The storage tank of claim 1, wherein said first conduit extends through a first penetration in a sidewall of said tank and said second conduit extends through a second penetration in the sidewall of said tank.

4. The storage tank of claim 1, wherein the inlet of said first conduit has a diameter smaller than a diameter of the outlet of said first conduit.

5. The storage tank of claim 1, wherein a first aperture of said second conduit disposed substantially in a gaseous phase of said tank reservoir is adapted to selectively supply a gas to said tank and extract the gas from said tank.

6. A cryogenic fluid storage tank comprising:
a tank having a tank reservoir adapted to store a cryogenic fluid including a cryogenic liquid and a gas;
a first conduit penetrating said tank and having an outlet and an inlet formed therein, the outlet and the inlet disposed within said tank, wherein said first conduit conveys the cryogenic liquid to the outlet from the inlet only through a single passageway formed in an interior of said first conduit, wherein the outlet of said first conduit is an open terminal end of the single passageway formed in the interior of said first conduit and the inlet is disposed between the open terminal end and a portion of said tank where the first conduit penetrates said tank, and wherein the outlet is disposed substantially in a gaseous phase of said tank reservoir and the inlet is disposed substantially in a liquid phase of said tank reservoir; and
a second conduit penetrating said tank and disposed within said tank adapted to selectively supply the gas to said tank and extract the gas from said tank, wherein a first aperture of said second conduit disposed substantially in a gaseous phase of said tank reservoir is adapted to selectively supply a gas to said tank and extract the gas from said tank,
wherein said first conduit has a substantial v-shape and the inlet is formed in the first conduit adjacent a nadir of the v-shape near a bottom of the tank reservoir.

7. The storage tank of claim 6, further comprising a vacuum tube penetrating a sidewall of said tank, wherein a portion of said first conduit and a portion of said second conduit are disposed in the vacuum tube.

8. The storage tank of claim 6, wherein said first conduit extends through a first penetration in a sidewall of said tank and said second conduit extends through a second penetration in the sidewall of said tank.

9. The storage tank of claim 6, wherein the inlet of said first conduit has a diameter smaller than a diameter of the outlet of said first conduit.

10. A cryogenic fluid storage tank comprising:
a tank having a tank reservoir adapted to store a cryogenic fluid including a cryogenic liquid and a gas;
a first conduit penetrating said tank and having an outlet and an inlet formed therein, the outlet and the inlet disposed within said tank, wherein said first conduit conveys the cryogenic liquid to the outlet from the inlet only through a single passageway formed in an interior of said first conduit, wherein the outlet of said first conduit is an open terminal end of the single passageway formed in the interior of said first conduit and the inlet is disposed between the open terminal end and a portion of said tank where the first conduit penetrates said tank, and wherein the outlet is disposed substantially in a gaseous phase of said tank reservoir and the inlet is disposed substantially in a liquid phase of said tank reservoir; and
a second conduit penetrating said tank and disposed within said tank adapted to selectively supply the gas to said tank and extract the gas from said tank, wherein the first aperture of said second conduit is disposed substantially in a gaseous phase of said tank reservoir; and
a vacuum tube penetrating a sidewall of said tank, wherein a portion of said first conduit and a portion of said second conduit are disposed in the vacuum tube,
wherein said first conduit has a substantial v-shape and the inlet is formed in the first conduit adjacent a nadir of the v-shape near a bottom of the tank reservoir.

11. The storage tank of claim 10, wherein the inlet of said first conduit has a diameter smaller than a diameter of the outlet of said first conduit.

12. The storage tank of claim 10, wherein the cryogenic liquid is one of hydrogen, oxygen, nitrogen, and helium.

* * * * *